Figure 1:
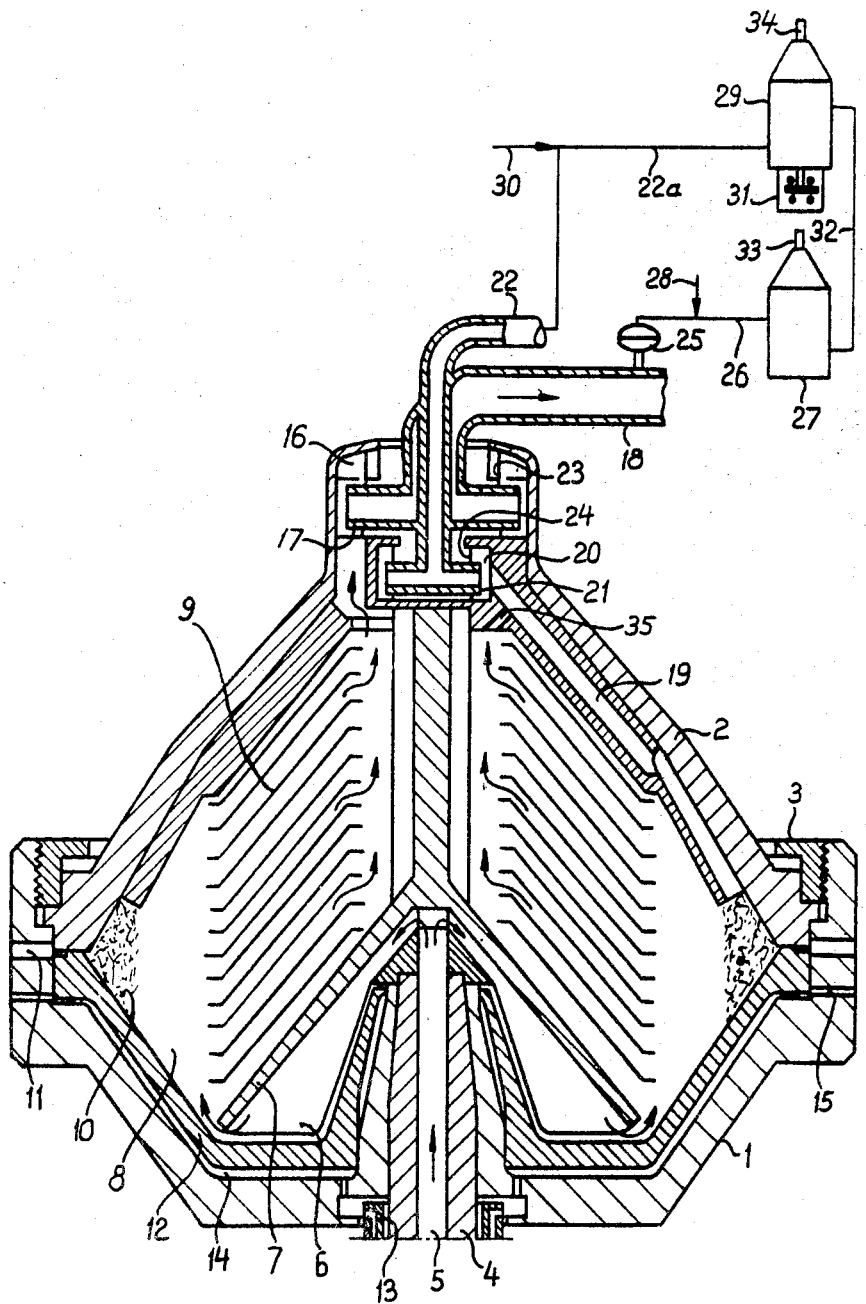

United States Patent

Nilsson

[15] 3,642,196
[45] Feb. 15, 1972

[54] CENTRIFUGE WITH SLUDGE LEVEL SENSING MEANS

[72] Inventor: Vilgot Raymond Nilsson, Hagersten, Sweden

[73] Assignee: Alfa-Laval AB, Tumba, Sweden

[22] Filed: May 4, 1970

[21] Appl. No.: 34,208

[30] Foreign Application Priority Data

May 8, 1969 Sweden..................................6513/69

[52] U.S. Cl. ..........................................233/19 A, 210/371
[51] Int. Cl. ......................................................B04b 11/00
[58] Field of Search ...................233/19 R, 19 A, 14 R, 14 A, 233/20 R, 20 A; 210/104, 105, 369, 370, 371

[56] References Cited

UNITED STATES PATENTS

| 3,408,000 | 10/1968 | Nilson | 233/19 R |
| 3,494,545 | 2/1970 | Nilson | 233/19 R |
| 3,396,910 | 8/1968 | Steinacker | 233/14 R |
| 3,081,027 | 3/1963 | Coulson | 233/19 R |
| 2,628,023 | 2/1953 | Dahlstedt | 233/19 R |

Primary Examiner—Jordan Franklin
Assistant Examiner—George H. Krizmanich
Attorney—Davis, Hoxie, Faithful & Hapgood

[57] ABSTRACT

The centrifugal rotor has a sludge-accumulating space from which an indicating channel extends inwardly to the region of the rotor axis. Clogging of the outer end of this channel by sludge is sensed by a device comprising a pressure signal amplifier, a pressure differential gage, a pressure-transmitting connection between one side of the amplifier and one side of the gage, a connection for transmitting a pressure of the liquid being separated, and a connection for transmitting a pressure of the liquid in the indicating channel, one of said last two connections leading to the other side of the amplifier and the other of said last two connections leading to the other side of said gage. Thus, the arrangement provides a measure of the difference between the pressure of the indicating liquid and the pressure of the separated liquid.

4 Claims, 4 Drawing Figures

CENTRIFUGE WITH SLUDGE LEVEL SENSING MEANS

The present invention relates to a centrifuge having an outlet for separated liquid and a means for indicating the sludge level in the sludge space of the rotor, such means comprising an indicating channel extending from the sludge space inwardly to the axis of the rotor and rotating therewith, and a device connected to this channel for sensing clogging of the opening of the channel into the sludge space with sludge.

In centrifuges of this kind, the sludge level indicating signal, generated by the clogging of the indicating channel with sludge, has been based upon sensing the absolute pressure in the sludge space. Consequently, this signal is not always due to the formation of a definite sludge level but may also be influenced by changes in the liquid pressure in the separating space, such as may occur with changes in the supply of liquid to be separated or changes in the counterpressure in the outlet for the separated liquid. According to Swedish Pat. No. 213,945, it has been proposed to eliminate these signal-disturbing factors by an arrangement of two indicating channels, the outer openings of which are situated at different radial distances from the axis of rotation. Thus, there is sensed only that pressure change which is caused by the sludge-clogging of one of the two indicating channels. However, this solution requires that each of the two indicating channels be connected to a corresponding stationary pipeline situated outside the centrifuge rotor. If the centrifuge is of a closed type so that these connections are hermetic and require sealing rings, it is necessary to make one of the sealing rings of the centrifuge with an extra large diameter, which has caused wearing problems. If the centrifuge is provided with a paring device serving as the outlet for the separated liquid, and the indicating channel is also connected to a paring device, the arrangement of a plurality of paring chambers causes space problems.

According to the present invention, these disadvantages are avoided while maintaining the sludge level sensing device unaffected by the aforesaid signal-disturbing factors, in a centrifuge of the kind previously described. More particularly, the sensing device comprises a pressure signal amplifier, a pressure difference gage, a pressure-transmitting connection between one side of the amplifier and one side of the gage, a connection for transmitting a pressure of the liquid being separated, and a connection for transmitting a pressure of the liquid in the indicating channel, one of these last two connections leading to the other side of the amplifier and the other connection leading to the other side of the gage. The pressure-transmitting connections can be hydraulic, pneumatic or electrical.

The invention can be utilized in centrifuges of either the open type or the closed type. In centrifuges having hermetically connected inlets and outlets, and also in centrifuges having an overflow outlet for discharging the separated liquid, the connection for transmitting a pressure of the liquid being separated can be connected to the centrifuge inlet. In centrifuges having a paring device for discharging the separated liquid, this same connection can be connected to the centrifuge inlet if a valve for maintaining a constant pressure is inserted in the outlet channel of the paring device. According to a preferred embodiment of the invention, which is simple from a constructional point of view and can be used in open as well as in closed centrifuges, the connection for transmitting a pressure of the liquid being separated is connected to the outlet for the separated liquid. Pneumatic pressure-transmitting connections are preferred so as to actuate the pressure signal amplifier and the pressure difference gage in a harmless way. Hydraulic transmission of the pressure signals to these devices can be harmful to their pressure-actuated instruments.

Figure 2:
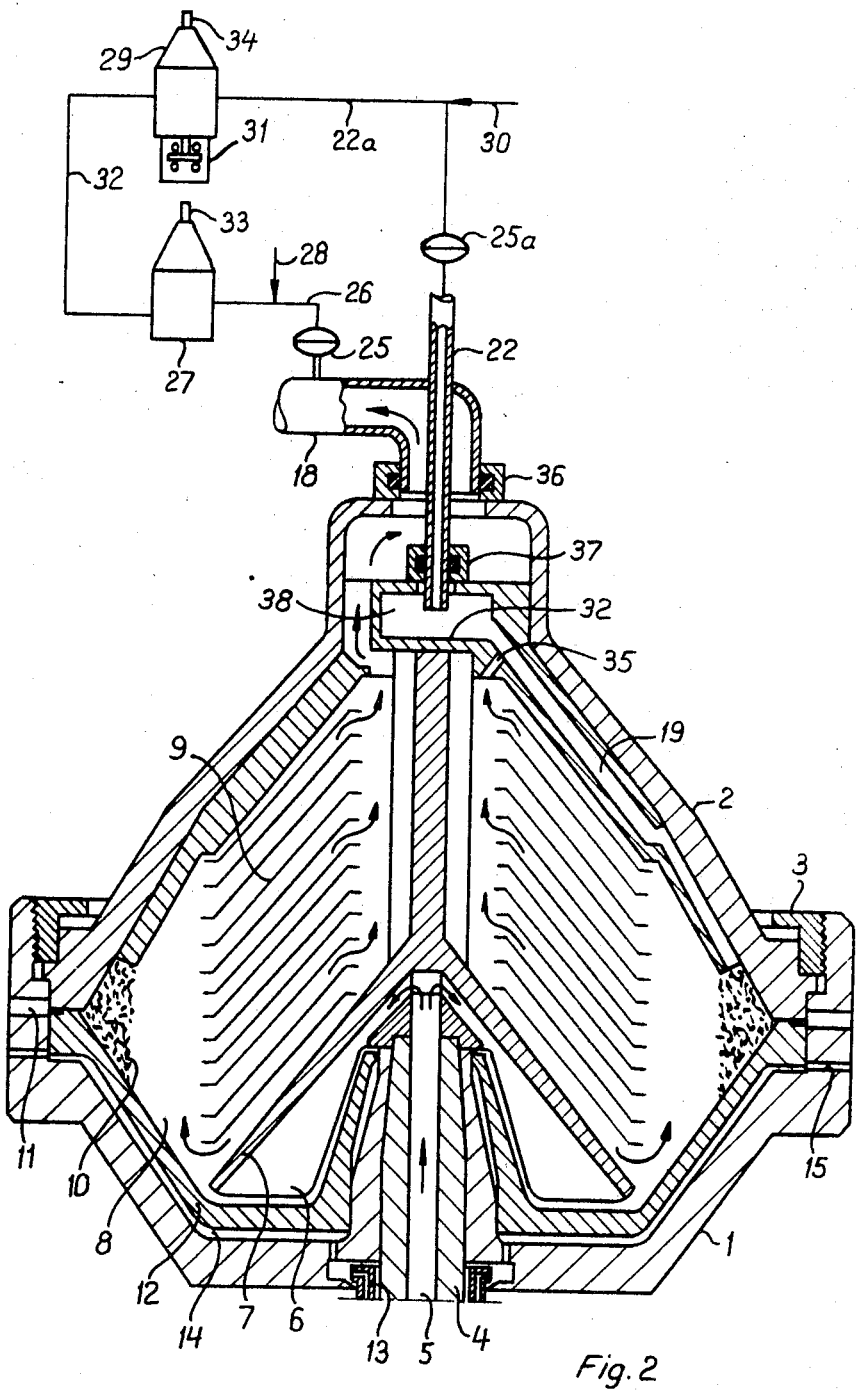
Figure 3:
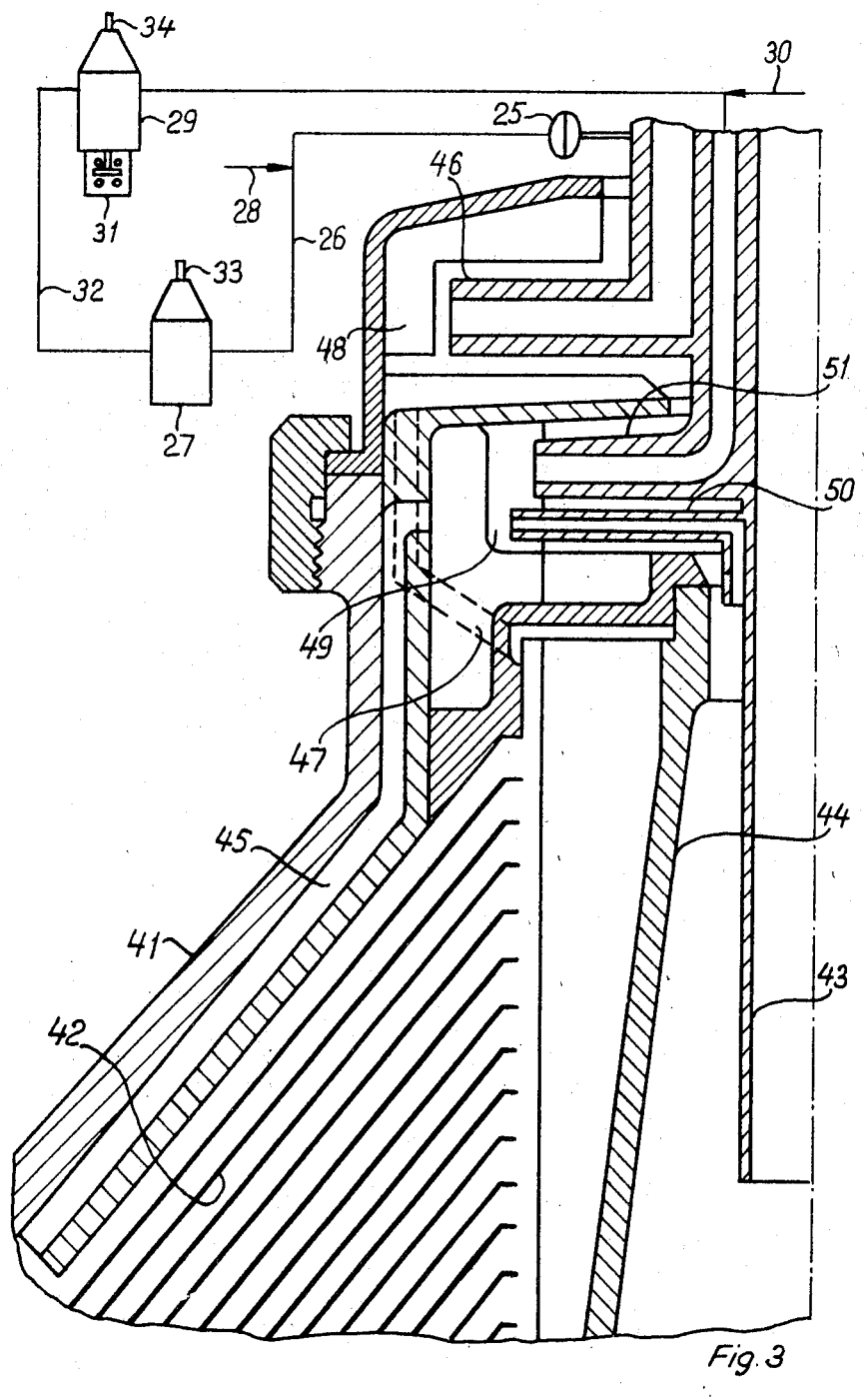
Figure 4:
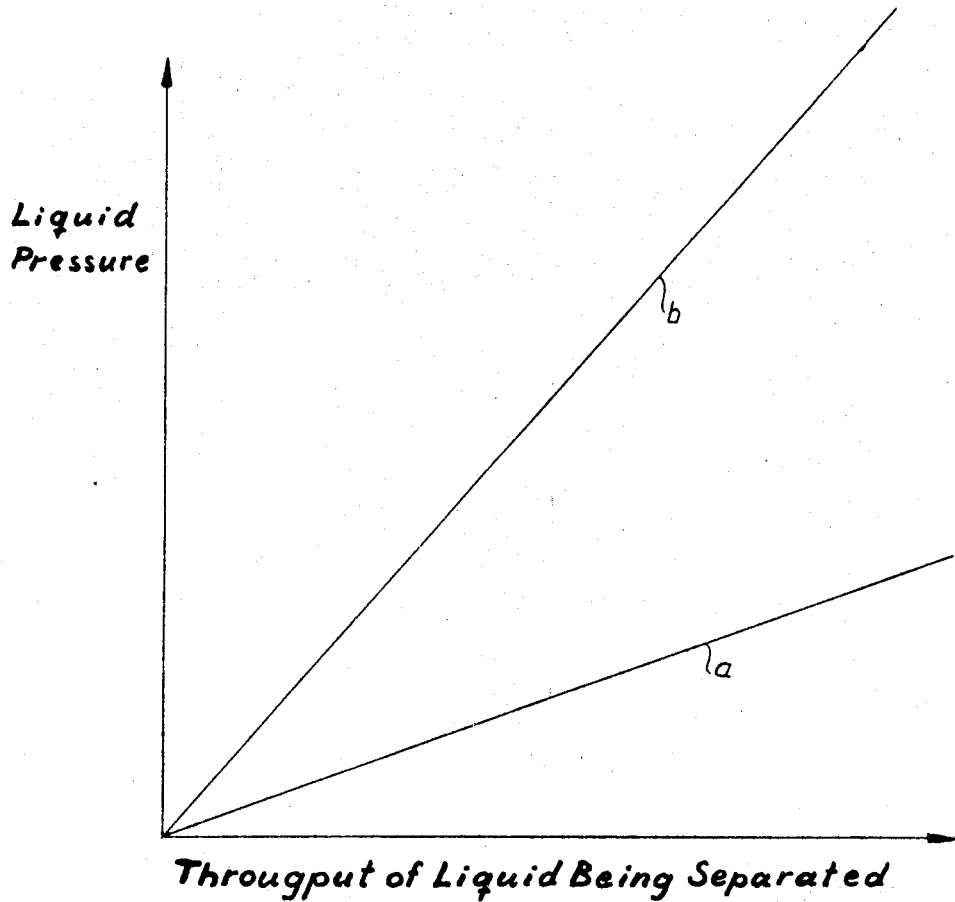

The invention is described more in detail below with reference to the accompanying drawings, in which FIGS. 1, 2 and 3 are axial sectional views of different embodiments of the present centrifuge, and FIG. 4 is a diagram showing the pressure of the liquid being separated and that of the indicating liquid in dependence of the throughput of the liquid being separated.

In FIG. 1, the centrifuge rotor 1 has a cover 2 which is held fast to the part 1 by means of a locking ring 3. The rotor is carried and driven by a shaft 4 which is provided with a central channel 5 for the supply of a sludge-containing liquid to be separated. This liquid is led by a distributor 7, provided with radial entraining vanes 6, into the separating chamber 8. The latter contains a set of conical discs 9. Sludge 10 separated from the liquid is collected at the periphery of the separating chamber and is discharged intermittently through openings 11 in the rotor body 1. These openings are alternately uncovered and closed by a valve piston 12, the movements of which are effected in a conventional manner by means of a liquid from a cylindrical supply duct 13 surrounding the shaft 4. The piston 12 is pressed upward against the cover 2 to close the sludge outlets 11 when liquid is supplied from duct 13 to a space 14 below the piston, a certain outflow of this liquid taking place at the same time through drain holes 15. The piston is pressed downward by the liquid pressure in the separating space 8 when the liquid supply through the duct 13 is interrupted, since the liquid is then drained from the space 14 through the holes 15.

Separated liquid flows from the inner edge of the disc set 9 to a paring chamber 16, in which there is mounted a stationary paring disc 17 which discharges separated liquid through an outlet pipe 18. The indicating channel 19 may be formed by one or more radially extending tubes or by a disc interspace which is divided by radially extending ridges, it being assumed that the section in the left-hand part of FIG. 1 is taken through such a ridge. The radially inner end of the indicating channel 19 opens into a paring chamber 20 in which there is mounted a stationary paring disc 21 connected to a discharge pipeline 22. The level of the separated liquid is shown at 23, and the level of the indicating liquid is shown at 24.

On the outlet pipe 18 there is mounted a diaphragm housing 25, the diaphragm of which is subjected on one side to the liquid pressure in the outlet pipe 18. The other side of this diaphragm is subjected to the pressure of air which is blown into a pipeline 26 connecting the diaphragm housing to one side of a pressure signal amplifier 27 of a conventional type. The air is blown into the pipeline 26 through a branch pipe 28. That part of the diaphragm housing 25 to which the air pipeline 26 leads has a throttled outlet hole (not shown) to the atmosphere, thus providing a conventional arrangement whereby the air pressure in pipeline 26 varies in accordance with variations of the liquid pressure in outlet pipe 18. The pipeline 22 is in turn connected by duct 22a to one side of a pressure differential gage 29, also of a conventional type, and air is blown into the duct 22a through a pipe indicated by an arrow 30. The pressure difference gauge 29 is provided with an electric switch 31 shown schematically in the drawing. The other side of the signal amplifier 27 has a pneumatic connection 32 to the other side of the pressure difference gage 29. In principle, this connection can be hydraulic or electric instead of pneumatic. The signal amplifier 27 is provided with an adjustment screw 33 for changing the amplification degree, and the pressure difference gage 29 is provided with an adjustment screw 34 for adjusting the pressure difference to which the gage will react. The indicating channel 19 is provided with a leakage hole 35 which is necessary for the generation of the sludge clogging signal. In principle, the amplifier 27 and the gage 29 can change places with each other.

In operation, the air blown in through the pipelines 30 and 22 flows through the paring disc 21 and into the paring chamber 20, where it passes through the liquid before reaching the atmosphere. The position of the liquid level 24 corresponds to the counterpressure which the air meets in its outflow, and this counterpressure actuates the pressure difference gage 29 via the pipeline 22—22a. The pressure of the separated liquid discharged by the paring disc 17 and pipe 18 corresponds to the position of the liquid level 23 and acts upon the lower side of the diaphragm in housing 25, and the upper side of this diaphragm is acted upon by air blown in through the pipelines 28 and 26. This air leaks out through the aforementioned throttled hole in the diaphragm housing wall and subjects the signal amplifier 27 via the pipeline 26 to an air pressure corresponding to the separated liquid pressure in pipe 18. Thus, the pressure of the separated liquid actuates the signal amplifier pneumatically. The pressure signal received by the signal amplifier is transmitted, after an amplification adjusted by means of the screw 33, to the pressure difference gage 29 via the pipeline 32. When sludge clogs the opening of the channel 19 into the sludge space, the liquid level 24 moves radially outward due to leakage through the hole 35, so that the air flowing out through the paring disc 21 meets a reduced counterpressure. This means that the pressure difference gage 29 via the pipeline 22—22a is acted upon by a reduced pressure and senses an increased difference between the pressure of the indicating liquid and that of the separated liquid. When this difference corresponds to the difference for which the screw 34 is adjusted empirically, the electric switch 31 is actuated to initiate a sludge discharge by conventional means (not shown). The influence of variations in the supply of the liquid to be separated or in the counterpressure of the discharging separated liquid on the sludge clogging signal is eliminated, since the absolute pressure of the indicating liquid is not measured but rather the difference between the pressure of the indicating liquid and that of the separated liquid (in other words, the difference between the levels 24 and 23 of these liquids).

According to FIG. 2, in which corresponding details have the same reference numerals as in FIG. 1, the pipeline 18 is hermetically connected to the rotor by means of a seal 36, and the pipeline 22 hermetically connected to the inner end of the indicating channel 19 by means of a seal 37. This channel end has the form of a central space 38 into which the pipeline 22 opens. The other end of the pipeline 22 opens into a diaphragm housing 25a, and the continuation of the pipeline 22 to the pressure difference gage 29 is designated at 22a.

The arrangement according to FIG. 2 functions in principle in the same way as the arrangement according to FIG. 1. The difference is only that in the embodiment according to FIG. 2, a reduction of the pressure in the space 38 is sensed when a sludge plug has been formed at the outer end of the channel 19.

In FIG. 3, showing part of an axial section of still another embodiment of the present centrifuge, the reference numeral 41 designates the rotor containing a set of conical discs 42, a distributor 44 and an indicating channel 45, the radially outer opening of which is located in the sludge space of the rotor. The sludge-containing liquid is supplied to the rotor through a stationary central inlet pipe 43, and a stationary paring disc 46 is provided for the discharge of the separated liquid. A channel 47 leads from the inner edges of the discs 42 to a paring chamber 48 containing the paring disc 46. The channel 45 opens at its radially inner end into a paring chamber 49, in which are provided two stationary paring discs 50 and 51. The lower paring disc 50 leads the liquid, pared by this disc, through the distributor 44 back to the separating chamber of the rotor.

The parts 25 to 34 in FIG. 3 are the same as those in FIG. 1. Thus, the diaphragm housing 25 is mounted on the outlet pipeline of the paring disc 46, and through the air blown in at 30 the level of the indicating liquid in the paring chamber 49 is sensed, which sensing takes place in the pressure difference gage 29. For the rest, the parts 25 to 34 function in the same way as those in the embodiment according to FIG. 1. The paring disc 50 corresponds in its effect to the leakage hole 35 in FIG. 1 and thus accommodates the displacement of the liquid level in the paring chamber 49 radially outward when a sludge plug has been formed in the outer end of the indicating channel 45.

The diagram according to FIG. 4 has for its purpose to explain the duty of the pressure signal amplifier 27. Owing to the fact that the flow channels of the liquid to be separated and the indicating liquid onto the pressure-sensing means have different flow resistances, a pressure change in the one liquid will not correspond to an equally great pressure change in the other liquid, calculated in absolute measures, during the separation periods between the sludge cloggings of the indicating channel. However, since the relationship between the pressure of each of the two liquids and the throughput of the liquid being separated, in the diagram according to FIG. 4, forms a straight line, it is possible to eliminate the divergence of the pressure changes so that the two relationship lines are made parallel or coincident. According to the invention, this is effected by means of the pressure signal amplifier 27. In FIG. 4, in which it is assumed that the relationship lines start from the origin (although it is not necessary that this be the case), the throughput of the liquid being separated is traced on the abscissa and the liquid pressure on the ordinate. The line $a$ is assumed to designate the relationship line of the indicating liquid and the line $b$ the relationship line of the liquid being separated. By turning the adjustment screw 33 of the signal amplifier 27, the line $b$ can be in effect turned around the origin such that the line $b$ will coincide with the line $a$. If the two lines $a$ and $b$ do not cut any of the coordinate lines in the same point, the lines $a$ and $b$ can be caused to become parallel by turning the screw 33. This, however, gives the same desired result.

It will be observed that in FIG. 3 the inlet pipe 43 constitutes a stationary duct connected to the rotor inlet, the paring disc 46 constitutes a stationary duct leading from the rotor outlet for the separated liquid, and leading from the rotor outlet via disc 46 is a connection including the parts 25–26 for transmitting pneumatically to amplifier 27 a pressure of the liquid being separated. It will also be observed that air blown in at 30 (FIG. 1) enters both of the pipelines 22 and 22a, so that the latter line is strictly pneumatic. The line 22, on the other hand, contains liquid at a level depending upon the liquid level 24 and through which air is forced downward into paring chamber 20 as previously described.

I claim:

1. In combination with a centrifuge comprising a centrifugal rotor having an inlet for sludge-containing liquid and also having an outlet for separated liquid and a sludge space for accumulating separated sludge, the rotor being provided with an indicating channel extending from said sludge space inwardly to the region of the rotor axis and rotating with the rotor, a device connected to said channel for sensing when sludge clogs the opening of the channel into the sludge space, said device comprising a pressure signal amplifier, a pressure differential gage, a pressure-transmitting connection between one side of the amplifier and one side of the gage, a connection for transmitting a pressure of the liquid being separated to one of said amplifier and gage, and a connection for transmitting to the other of said amplifier and gage a pressure of the liquid in the indicating channel, one of said last two connections leading to the other side of the amplifier and the other of said last two connections leading to the other side of said gage.

2. The combination according to claim 1, comprising also stationary ducts connected to said rotor inlet and outlet, respectively, said connection for transmitting a pressure of the liquid being separated being connected to the rotor outlet.

3. The combination according to claim 1, in which said connection for transmitting a pressure of the liquid is separated being connected to said rotor outlet for the separated liquid.

4. The combination according to claim 1, in which said pressure-transmitting connections are pneumatic.

* * * * *